ELECTRIC ARC WELDING OF GENERALLY HORIZONTAL SEAMS
Filed Aug. 25, 1959 3 Sheets-Sheet 1
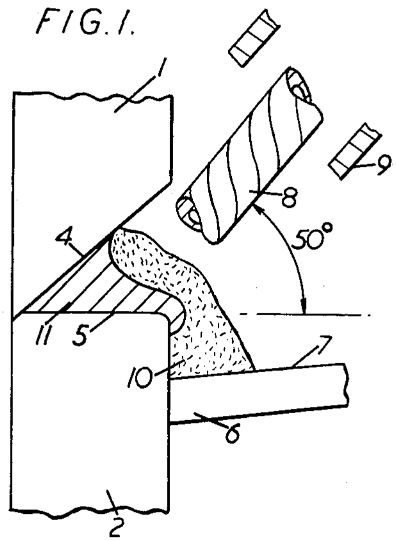
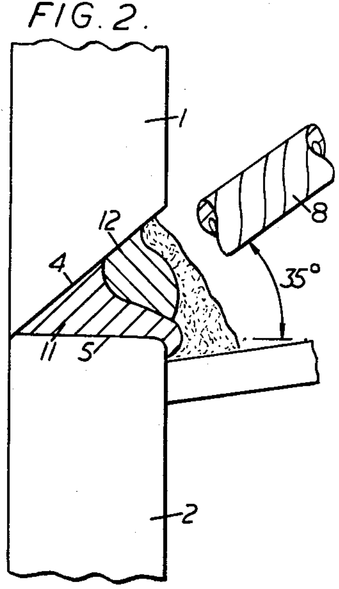
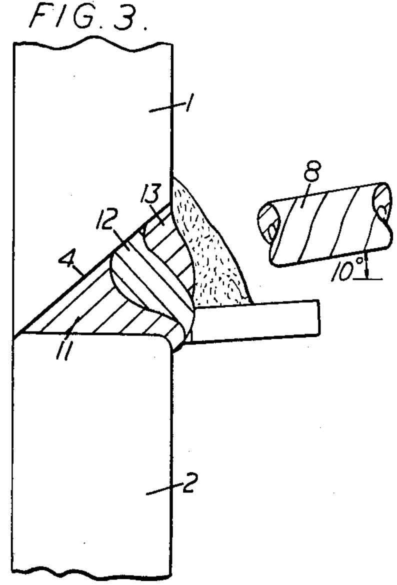
*Inventor*
ARTHUR ERNEST DEVILLE
MICHAEL PENSON
*By*
Aaron R. Townshend *Attorney*

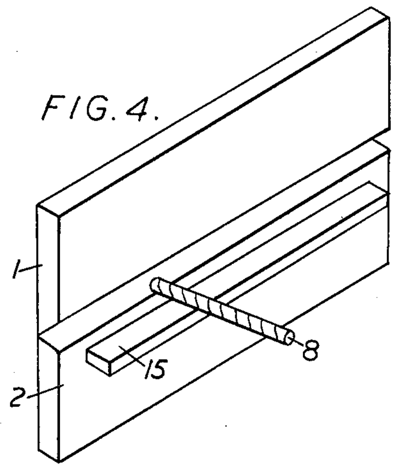
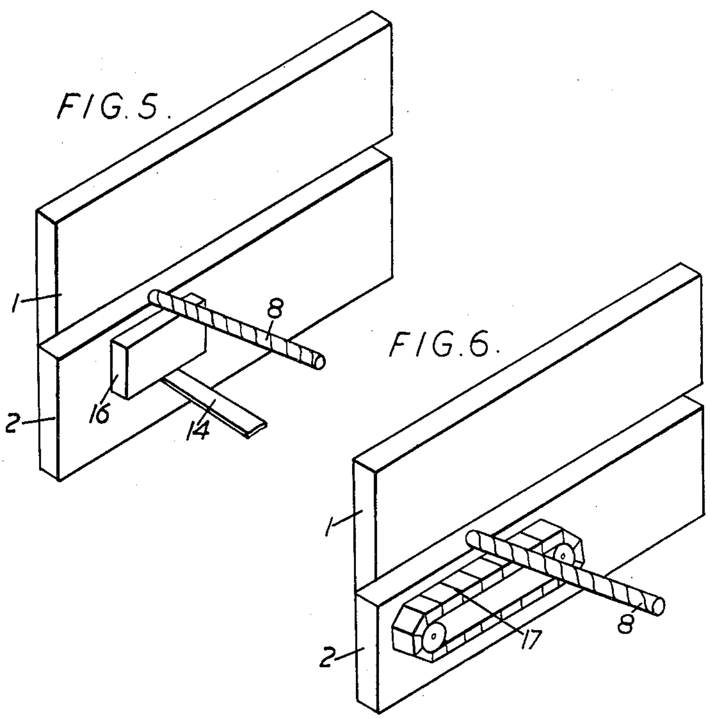
Inventor
ARTHUR ERNEST DEVILLE
MICHAEL PENSON
By
Aaron R. Townshend Attorney May 15, 1962 A. E. DEVILLE ETAL 3,035,159
ELECTRIC ARC WELDING OF GENERALLY HORIZONTAL SEAMS
Filed Aug. 25, 1959 3 Sheets-Sheet 3
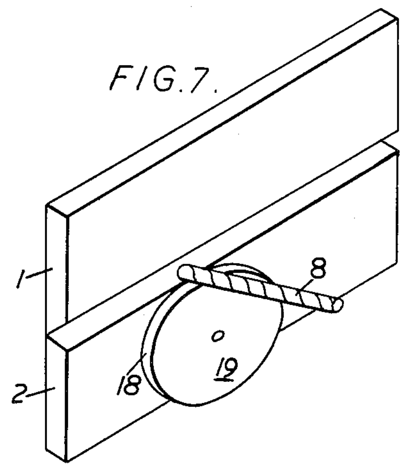
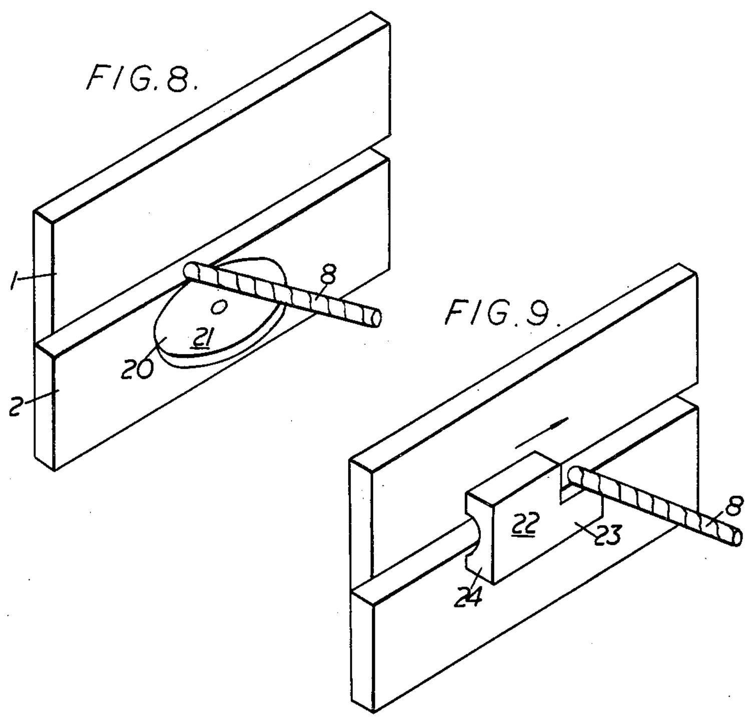
Inventor
ARTHUR ERNEST DEVILLE
MICHAEL PENSON
By
Aaron R. Townshend Attorney

United States Patent Office 3,035,159

Patented May 15, 1962

1

3,035,159

ELECTRIC ARC WELDING OF GENERALLY HORIZONTAL SEAMS

Arthur E. Deville, Tettenhall, and Michael Penson, Castlecroft, Wolverhampton, England, assignors to The British Oxygen Company Limited, a company of Great Britain Filed Aug. 25, 1959, Ser. No. 835,981
Claims priority, application Great Britain Aug. 28, 1958
7 Claims. (Cl. 219—137)

This invention relates to the electric arc welding of generally horizontal seams.

One seam of this type which is met with in the construction of large oil storage tanks, to quote but one of many examples, is the horizontal-vertical seam between vertically disposed plates which abut along a horizontal line. Horizontal-vertical seams may be welded manually or automatically but some welding processes have been considered unsuitable for welding such seams. Thus the rutile type coatings of certain flux coated electrodes produce a slag which has been found to give insufficient support during cooling to weld metal deposited in a horizontal-vertical seam. However, the advantages of flux coated electrodes of the rutile type, particularly but not necessarily when used in conjunction with a flowing stream of carbon dioxide which shields the arc and the weld zone, render the use of such electrodes desirable for the welding of horizontal-vertical seams, and it is an object of the present invention to provide a method and means whereby the welding of horizontal-vertical seams using an open welding arc is facilitated.

According to the present invention a method of electric arc welding a generally horizontal seam between abutting members consists in depositing a first pass of weld metal along the seam by feeding an electrode automatically to an open welding arc which is moved along the seam, supplying flux to provide a protective layer of slag on the deposited weld metal, and supporting the molten slag as it moulds the weld metal to a desired shape by means of a shelf which is spaced below the level of the upper surface of the lower abutting member onto which the first pass of weld metal is deposited, the spacing being such as to allow firstly for weld penetration into said upper surface and secondly for the thickness of the slag layer, raising the shelf to a higher level at which the shelf is spaced below the upper surface of the first pass of weld metal in the seam, the spacing being such as to allow firstly for weld penetration into the upper surface of the first pass of weld metal and secondly for the thickness of the slag layer, depositing a second pass of weld metal along the seam by feeding an electrode to an open welding arc which is moved along the seam, and supplying flux to provide a protective layer of slag on the second pass of the weld metal, the latter layer of slag being supported by the shelf at said higher level.

The most suitable spacing of the shelf or similar support below the upper surface of the base metal may be easily determined bearing in mind that the spacing of the shelf below the upper surface of the base metal onto which the pass of weld metal is to be deposited is to allow firstly for the weld penetration into the base metal and secondly for the thickness of the slag layer. An example is given later in this specification. It will be understood that if the pass of weld metal to be deposited is not the first pass then the weld metal deposited in any previous passes will be considered to be part of the base metal for the purpose of calculating the spacing of the shelf or similar support in the manner referred to in the penultimate sentence.

It has been found desirable to maintain the angle of inclination of the electrode to the horizontal constant during each weld pass and to reduce this angle progressively for successive passes. In each case the electrode need not be directed normally into the joint but may be inclined forwardly or rearwardly with respect to the joint.

2

A suitable plate edge preparation for plates to be welded by the method of the present invention is a single bevel including an angle of the order of 40° between the generally horizontal upper face of the lower plate and the bevelled face of the upper plate. With thick plates it may be necessary to use a double bevel plate edge preparation and to weld from both sides of the plates.

A welding process which is particularly suitable for the method of the present invention is the automatic welding process in which a flux coated electrode is continuously fed to a welding arc maintained between the end of the electrode and the plates being welded, the welding arc and zone being protected by a flowing stream of shielding gas such as carbon dioxide. A welding process in which a bare electrode wire is coated with a magnetic flux before it reaches the welding arc may also be used. A flowing stream of shielding gas may be used in this process.

A further alternative open arc process involves the use of a bare or lightly coated electrode wire or a flux coated electrode in a flowing stream of shielding gas, and the deposition of granular flux onto deposited weld metal immediately behind the arc.

Support for the molten slag may be provided by a shelf or similar support of metallic material such as steel or copper or by a shelf of refractory insulating material such as compressed glass fibres, and the shelf or similar support may remain stationary with respect to the plates being welded or may move along the seam with the welding apparatus. The shelf or similar support may be supported by a part of a welding head such as a gas directing nozzle, and be pressed against the base metal (i.e. the lower plate or a previously deposited pass of weld metal) by spring means.

Welding apparatus according to the invention may comprise, in combination, an electric arc welding head from which a consumable electrode may be fed automatically to a welding arc maintained in a gaseous atmosphere between the end of the electrode and a generally horizontal joint between abutting plates disposed in a vertical plane, means for moving the electric arc welding head along the joint, and a shelf or similar support movable along the joint with the electric arc welding head and adapted to provide support for a protective layer of slag as it moulds to a desired shape molten weld metal which has been deposited in the joint by the electrode.

The shelf may be flat and inclined towards the lower plate, or it may form part of a mould shaped to give lateral support to the layer of slag and thereby mould the deposited weld metal to a desired shape. Where a shaped mould is used it may be necessary to move the mould along the seam with the electrode if the electrode is to be directed into the mould. The leading part of the mould may be formed to allow the electrode to be directed into a part of the joint in proximity to the mould. Thus this leading part need be little more than a shelf whereas the main part of the mould may bridge the joint completely. Alternatively the shelf may be formed by a moving endless belt or a disc movable along the seam with the electrode. Either the side of the disc or the periphery of the disc may constitute the shelf, the disc being rolled along just beneath the joint.

The method of welding in accordance with the invention will now be described by way of example with reference to the nine figures of the accompanying drawing in which:

FIGURE 1 is a diagrammatic vertical section taken transversely of the joint between two plates being welded together during the first weld pass;

FIGURES 2 and 3 are similar views taken during the second and third weld passes respectively; and FIGURES 4, 5, 6, 7, 8 and 9 show diagrammatic perspective views of constructions of shelf or similar support which are in the form respectively of a stationary shelf, a movable shelf, a movable endless belt, a rotatable disc having a peripheral supporting surface, a rotatable disc having a flat supporting surface, and a movable mould arranged to bridge the joint.

Referring to FIGURE 1, two mild steel plates 1 and 2 of ⅝ inch thickness are shown during welding together along a horizontal butt joint. The plates were supported in a vertical plane, the upper plate 1 having had a 40° bevel machined on its abutting face 4, and the abutting face 5 of the lower plate 2 being left with its rolled edge extending normally of the plate.

A shelf 6 (not drawn to scale) consisting of a copper block ½ inch wide and 1 inch deep was supported with the upper edge in contact with the plate 2 and spaced a quarter of an inch below the abutting face of the lower plate 2. The edge of the shelf 6 abutting the lower plate was chamfered to produce an inclination of 5 to 10° of the upper surface 7 of the shelf 6 towards the plate 2.

The welding process adopted for the first two passes was that which forms the subject of copending patent application No. 661,666.

Weld metal was deposited in the joint by a welding electrode 8 which had a diameter equivalent to 10 S.W.G. and consisted of a central ferrous core wire around which were wound helically in opposite sense two layers of ferrous wires, each layer consisting of four wires. A welding electrode of this construction is described in patent specification No. 2,432,048. A flux coating disposed in the interstices between the wires included both rutile and basic materials the proportion of rutile materials being larger than that of the basic materials. An electric arc was established between the end of this electrode 8 and the abutting face 5 of the lower plate 2, and the electrode 8 was fed automatically into the seam towards this face at an angle of approximately 50° to this face and the horizontal. The arc and welding zone were shielded by a flowing stream of carbon dioxide supplied concentrically around the electrode through a gas directing nozzle 9 mounted on an arc welding head which is not shown in the drawings but is of conventional form for open-arc welding. Welding current of 475 amperes was supplied to the electrode and the welding head was moved along the joint at a speed of 15 inches per minute. The shelf 6 was secured to the gas directing nozzle 9 and moved alongside the lower plate 2 at the same speed. The shelf was spring-loaded against the plate, and the leading edge of the shelf was radiused to ride over irregularities in the plate. During welding, the shelf 6 supported a layer of molten flux 10 derived from the electrode coating while this layer of flux moulded the weld metal 11 deposited in this first pass.

The shelf 6 was then raised to the position shown in FIGURE 2, so that the distance between its upper face 7 and the abutting face 5 of the lower plate 2 was reduced to ⅛ inch, and a second pass 12 of weld metal was deposited with the electrode 8 inclined at an angle of 35° to this face 5 of the lower plate. For this second pass the welding current was reduced to 450 amperes but the same welding speed was maintained. In calculating the position of the shelf for this weld pass, the weld metal deposited in the first weld pass was considered to be part of the base metal. Thus the spacing of the shelf below the upper surface of the first pass of weld metal was adjusted to allow both for weld penetration during the second pass and for the thickness of the slag layer.

The shelf was again raised preparatory to depositing the third pass of weld metal, as shown in FIGURE 3, the upper face 7 of the shelf 6 being brought into contact with the weld metal 12 deposited in the second pass but being below the lower level to which the third pass 13 was expected to extend. The third pass was completed at the same welding current and welding speed as the second pass. To complete the weld a fourth pass of weld metal, not shown in the drawings, was then deposited manually with the electrode inclined at an angle of 10° to the abutting face of the lower plate. A manual technique using an "all-position" flux coated electrode was adopted with the fourth pass to avoid under-cutting which was obtained when this pass was deposited by the automatic process referred to above.

It should be noted that the present invention allows the use of high weld metal deposition rates.

The method of the present invention was also carried out using a granular submerged melt welding flux deposited immediately behind the welding arc from a hopper mounted on the arc welding head. This method maintained the advantages of the open arc welding process and gave a good surface finish to the deposited weld metal. Similar welding conditions apply for this method.

Various constructions of shelf or similar support may be used to support the layer of slag as it moulds the deposited weld metal. In FIGURES 4 and 5 is shown the use of a shelf having a flat upper surface which is inclined towards the lower plate 2. The shelf 15 of FIGURE 4 extends the length of the joint to be welded whereas the shelf 16 of FIGURE 5 is relatively short and is mounted on the arc welding head by a strut 14 for movement along the joint during welding. The shelf, and the other constructions referred to herein, may require to be artificially cooled in use by a flow of air, gas or water.

FIGURE 6 shows an endless belt 17 which may be used to support the layer of slag, the belt being rotated as it is moved along the joint with the arc welding head. The speed of the belt is such that it matches the speed of traverse of the electrode and since the direction is such that the face supporting the slag moves in opposition to the direction of traverse of the electrode no relative movement of the support to the pasty slag occurs, and sticking and drag effects are thereby eliminated. The use of the peripheral surface 18 of a disc 19 for slag support is shown in FIGURE 7, and FIGURE 8 shows the use of a side face 20 of a disc 21 for this purpose. Both discs are rotated and moved along the joint during welding.

In FIGURE 9, the shelf or similar support is in the form of a mould 22 having a leading part 23 in the form of a shelf, and a main part 24 that bridges the joint and provides lateral support for the layer of slag as it moulds the deposited weld metal to a desired shape.

We claim:

1. A method of electric arc welding a generally horizontal seam between abutting members which consists in depositing a first pass of weld metal along the seam by feeding an electrode automatically to an open welding arc which is moved along the seam, supplying flux to provide a protective layer of slag on the deposited weld metal, and supporting the molten slag as it moulds the weld metal to a desired shape by means of a shelf which is spaced below the level of the upper surface of the lower abutting member onto which the first pass of weld metal is deposited, the spacing being such as to allow firstly for weld penetration into said upper surface and secondly for the thickness of the slag layer, raising the shelf to a higher level at which the shelf is spaced below the upper surface of the first pass of weld metal in the seam, the spacing being such as to allow firstly for weld penetration into the upper surface of the first pass of weld metal and secondly for the thickness of the slag layer, depositing a second pass of weld metal along the seam by feeding an electrode to an open welding arc which is moved along the seam, and supplying flux to provide a protective layer of slag on the second pass of the weld metal, the latter layer of slag being supported by the shelf at said higher level.

2. A method in accordance with claim 1, characterised in that the flux is supplied by the electrode.

3. A method in accordance with claim 2, characterised in that the flux is supplied as a coating on the electrode.

4. A method in accordance with claim 3, characterised in that the electrode is a bare wire and that this wire is coated with magnetic flux before it reaches the welding arc.

5. A method in accordance with claim 1, characterised in that the flux is deposited in granular form immediately behind the welding arc.

6. A method in accordance with claim 1, characterised in that the electrode is directed ino the joint at an angle of approximately 50° to the horizontal during the first pass, and at an angle of approximately 35° to the horizontal during the second pass.

7. In apparatus for electric arc welding a generally horizontal seam between abutting members by depositing weld metal into the seam using an open welding arc and supplying flux to provide a protective layer of slag on the deposited weld metal, the improvement comprising a shelf member which is movable along the seam and consists of a leading part in the form of a shelf adapted to support said protective layer of slag, and a main part which bridges the seam and provides lateral support for said protective layer of slag so it moulds the deposited weld metal to a desired shape.

References Cited in the file of this patent

UNITED STATES PATENTS

| | | |
|---|---|---|
| 2,395,723 | Chmielewski | Feb. 26, 1946 |
| 2,529,812 | Peters | Nov. 14, 1950 |
| 2,638,524 | Meyer | May 12, 1953 |
| 2,713,106 | Arnold | July 12, 1953 |
| 2,752,468 | Costello | June 26, 1956 |
| 2,900,487 | Danhier | Aug. 18, 1959 |

FOREIGN PATENTS

| | | |
|---|---|---|
| 215,157 | Australia | Apr. 15, 1958 |
| 218,285 | Australia | Nov. 11, 1958 |

OTHER REFERENCES

"Welding Journal," May 1953, pp. 399–400, 405–6.